United States Patent
Brunault et al.

(10) Patent No.: US 9,125,274 B1
(45) Date of Patent: Sep. 1, 2015

(54) LIGHTING CONTROL TECHNIQUES CONSIDERING CHANGES IN EYE SENSITIVITY

(71) Applicants: Charles Brunault, South Hamilton, MA (US); Nancy Chen, North Andover, MA (US); Maria Thompson, Cheshire, CT (US); Julie Pereyra, Salem, MA (US)

(72) Inventors: Charles Brunault, South Hamilton, MA (US); Nancy Chen, North Andover, MA (US); Maria Thompson, Cheshire, CT (US); Julie Pereyra, Salem, MA (US)

(73) Assignee: OSRAM SYLVANIA, Inc., Danvers, MA (US)

( * ) Notice: Subject to any disclaimer, the term of this patent is extended or adjusted under 35 U.S.C. 154(b) by 0 days.

(21) Appl. No.: 14/296,998

(22) Filed: Jun. 5, 2014

(51) Int. Cl.
*H05B 37/02* (2006.01)
*H05B 33/08* (2006.01)

(52) U.S. Cl.
CPC ........ *H05B 33/0854* (2013.01); *H05B 33/0872* (2013.01); *H05B 37/0218* (2013.01); *H05B 37/0272* (2013.01); *H05B 37/0281* (2013.01); *Y02B 20/46* (2013.01); *Y02B 20/48* (2013.01)

(58) Field of Classification Search
None
See application file for complete search history.

(56) References Cited

U.S. PATENT DOCUMENTS

| | | | | |
|---|---|---|---|---|
| 8,035,320 B2* | 10/2011 | Sibert | | 315/312 |
| 8,264,168 B2* | 9/2012 | Feri et al. | | 315/294 |
| 8,796,951 B2* | 8/2014 | Feri et al. | | 315/295 |
| 8,928,232 B2* | 1/2015 | Aggarwal et al. | | 315/153 |
| 8,954,170 B2* | 2/2015 | Chemel et al. | | 700/19 |
| 9,060,392 B2* | 6/2015 | Aggarwal et al. | | 1/1 |
| 2009/0146982 A1* | 6/2009 | Thielman et al. | | 345/207 |
| 2013/0249410 A1* | 9/2013 | Thompson | | 315/158 |
| 2014/0354161 A1* | 12/2014 | Aggarwal et al. | | 315/153 |

\* cited by examiner

*Primary Examiner* — Vibol Tan
(74) *Attorney, Agent, or Firm* — Andrew Martin

(57) ABSTRACT

Techniques are disclosed for manipulating both colored and tunable white lighting systems in order to enhance visual comfort and allow an observer's eyes to recover from exposure to colored light. A lighting system may gradually adjust the color, color temperature, and intensity of various multi-chip LED panels in order to provide pleasant and acceptable changes in light settings. Instead of abruptly switching from one light setting to another, a lighting system may fade to an intermediate transition setting and subsequently fade to the final light setting, allowing an observer's eyes time to adapt to the new light settings. In one example, switching from blue light to a neutral white light may involve a gradual fading from blue light, to a cool white light, and then to a neutral white light, thus allowing the end user's eyes to adapt to the new light settings.

20 Claims, 6 Drawing Sheets

LIGHTING CONTROL TECHNIQUES CONSIDERING CHANGES IN EYE SENSITIVITY

RELATED APPLICATION

This application is related to U.S. application Ser. No. 13/425,520 filed Mar. 21, 2012, and entitled "Dynamic Lighting Based on Activity Type" which is herein incorporated by reference in its entirety.

FIELD OF THE DISCLOSURE

This disclosure relates to lighting systems, and more particularly, to controlling the lighting characteristics of solid-state lighting elements.

BACKGROUND

Lighting systems may be used to control various lighting elements, including incandescent, fluorescent, and solid-state lighting elements. Solid-state lighting elements, such as LEDs, may include LEDs of various colors that can be individually powered and manipulated in order to achieve different colors and brightness levels. In addition to outputting different colors, white light of various intensities and light temperatures may be achieved by mixing together light from multiple colored LEDs. For example, light from red, green, blue, or other colored LEDs may be mixed to produce so-called tunable white light of different intensities and color temperatures. Most colors may be achieved by mixing different amounts of these and/or other colors. Other techniques for producing white light from LEDs involve coating a colored LED with a phosphor coating. For example, coating a blue LED with a yellow phosphor can produce white light.

DETAILED DESCRIPTION

Figure 1:
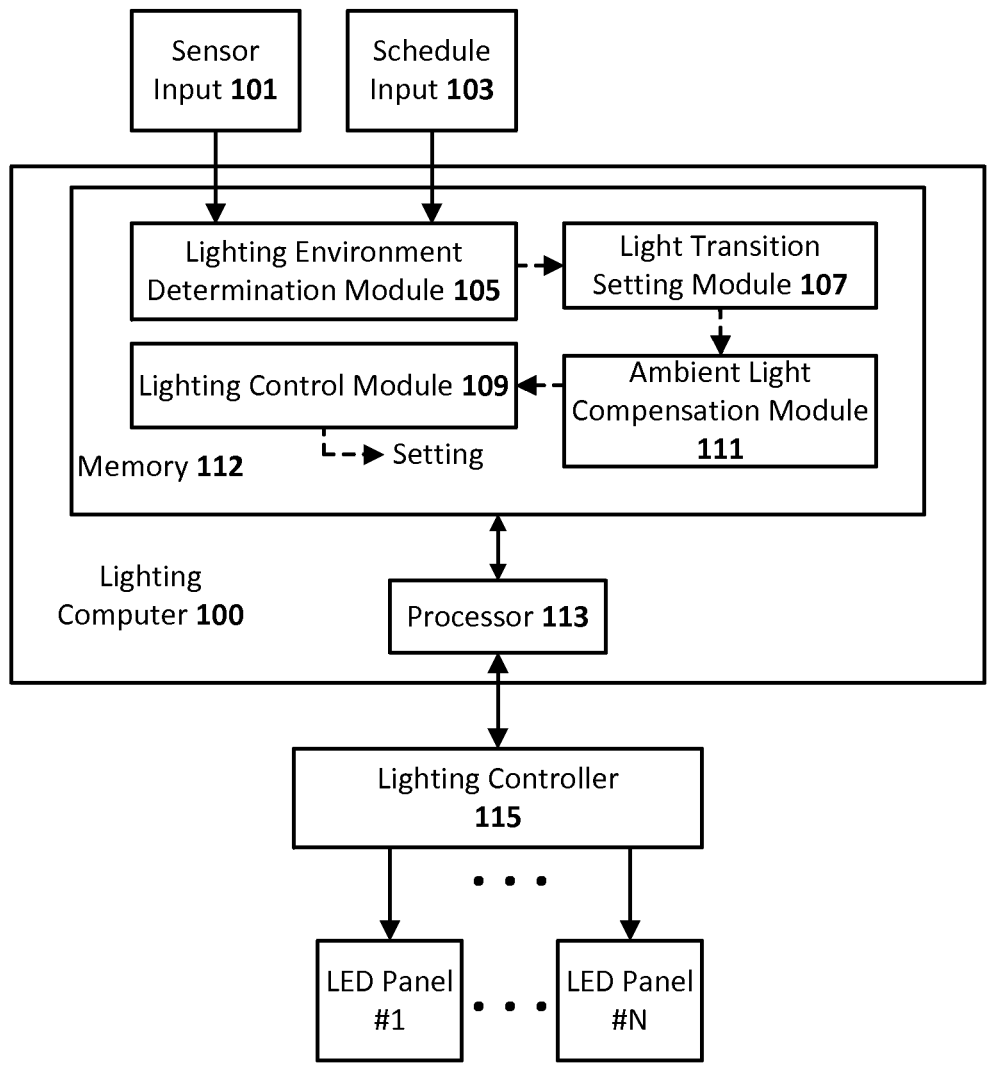
FIG. 1 is a block diagram illustrating a lighting control system, configured in accordance with an embodiment of the present invention.

Techniques are disclosed for manipulating color tunable lighting systems in order to enhance visual comfort and allow an observer's eyes to recover from an initial exposure to colored light. A new light setting may be commanded, for example, in the context of light-based communications or as a power conservation measure. A lighting system configured in accordance with one embodiment gradually adjusts one or more of the color saturation, color temperature, and intensity of various color tunable LED panels in order to provide pleasant and acceptable changes in light settings. So, for instance, instead of abruptly switching from one light setting to another, the lighting system may initially fade to an intermediate transition setting and subsequently fade to the target light setting, allowing an observer's eyes time to adapt to the new light settings. For example, switching from blue light to a neutral white light may involve gradually fading from blue light to a cool white light over a first period of time, and then fading to a neutral white light over a second period of time, thus allowing the an observer's eyes to adapt to the new light settings. Without such a gradual fading, an observer's eyes, which have become accustomed to the blue light, will temporarily perceive the neutral white light as too warm and having a yellow-orange hue. The first and second periods of time can be the same or different and may be, for example, in the range of 5 seconds to several minutes, in some embodiments. Factors that affect the duration of a transition include, for example, the color saturation, color temperature, and intensity values of the starting and ending light source(s) being transitioned, and the duration and intensity of exposure to the initial light setting. Other factors may further include the current color saturation, color temperature, and intensity values of other light sources in the environment being lit. Using the various techniques provided herein, the change in lighting is relatively subtle and may even go unnoticed by an average observer in the environment being lit.

As will be appreciated, the characterization of a given light sources as "neutral" or "warm" or "cool" is a relatively imprecise process. To this end, note that the use of such terminology herein is not intended to imply any particular light qualities or limitations. Rather, these terms are merely used to demonstrate a change in a given light source from one appearance to another. In addition, the effect that provisioned light has on an observer may be positive in some cases (e.g., pleasing, comforting, informative, etc) or negative in other cases (e.g., disruptive, jarring, etc) or neutral in still other cases (e.g., unnoticed, low impact). Different observers may feel differently about the same light source. The impact of the lighting on a given observer will also depend on the purpose of given lighting changes. For instance, lighting changes that are intended to have an impact may be, for example, to notify the observer of an event or scheduled appointment. In contrast, lighting changes intended to have no or an otherwise low impact may be, for example, to calm or create a pleasant work space. To this end, the techniques provided herein can be used to effect any such lighting changes, whether it be to make those lighting changes perceptible to the observer (e.g., lighting-based communication) or imperceptible or otherwise minimally disruptive to the observer (e.g., switching to a lower power lighting scheme).

General Overview

The perception of light by an observer's eyes may depend on various factors, including the color of light recently exposed to the observer's eyes and the proximity of other light sources. With respect to the color of recent observations, viewing colored light can temporarily reduce the sensitivity to that color in an observer's eyes. For example, if an observer views blue light for a period of time, the eyes' sensitivity to blue light may be dulled and a subsequently displayed white light would appear temporarily warmer or at a lower color temperature than it would normally appear under steady-state observation. This is because white light has a balanced composition of many colors and a decreased response to the blue component will cause its complimentary component, the yellow-orange component of white light, to appear higher. In another example, if a user views orange light for a period of time, the eyes' response to orange light would be temporarily suppressed and a subsequently displayed white light would appear bluer, cooler, or at a higher color temperature. In other examples, exposure to green light makes subsequently presented white light appear slightly pink, and vice versa. More generally, any exposure to an initial colored light temporarily decreases the response to that color in an observer's eyes thereby causing a subsequently presented light, whether it is white or a more saturated hue, to appear slightly tinged with the initial light's complimentary color. With respect to the proximity of other light sources, note that proximity will tend to amplify the differences in light settings between two light sources. For example, two light sources which in isolation appear to have weak non-saturated blue and orange colors, respectively, will appear to have higher color saturations when placed next to each other.

Thus, in accordance with an embodiment of the present invention, lighting control techniques are disclosed which can manipulate the color saturation, and/or intensity of various lighting elements in order to allow an observer's eyes to recover from an initial exposure to colored light and to compensate for perceived distortions in color and/or color temperature caused by other light sources. A new light setting may be commanded, for example, in the context of light-based communications, such as the case where changes in lighting color are used to signal or otherwise inform the user of the space of an event (e.g., a change of a desk lamp from white to green light to notify the user of an upcoming calendared event, or some other detectable event). Alternatively, or in addition, a new light setting may be called for in the context of as a power conservation measure, such as the case where the lights transition to a lower power consumption color when a room or area is unoccupied, when the natural light in the room is higher and/or at certain times of the work day (e.g., during shift changes or break times). The techniques disclosed may take into account, for example, the duration, intensity, viewing angle, and/or color saturation of a previously displayed light setting as well as the proximity and/or color saturation of other lighting elements present in the area.

In one example embodiment, a room is equipped with a color tunable LED panel-based system that is configured to provide independent manipulation of the color, color temperature, and intensity of each panel within the system. In this example, the color tunable LED panels can display white and colored light by controlling the proportions and intensities of the component colors (e.g. red, green, and blue in a three channel RGB LED panel) that combine to form each individual light color. In particular, the color of white light can be characterized by its color temperature, measured in Kelvin, where cool white light appears slightly blue in color and warm white light appears slightly yellow-orange in color. Specifically, cool white light (i.e., white light with a high color temperature) has a larger proportion of the blue component than neutral white light, while warm white light (i.e., white light with a low color temperature) has a larger proportion of the yellow-orange component. In one example scenario, assume the room is initially illuminated with blue light from one or more lighting panels, and the light is intended to switch to a neutral white color having a color temperature of 3500K. As discussed above, when an observer has been immersed in blue light, his/her eyes become less responsive to blue light and an abrupt switch to neutral white will appear more yellow, giving the impression of light having a lower than desired color temperature. To compensate for this perceived distortion, the lighting system is configured to command a transitional light setting with a cool white transitional color (e.g., 4500K to 5000K), which would appear to the observer as a more neutral white light. In this example, after the observer's eyes have recovered from the initial exposure to blue light (e.g., after displaying the cool white light for 60 to 180 seconds), the lighting system may then transition to the target neutral white color (e.g., 3500K to 4000K). In one example embodiment, the transition to the target setting takes place at the same rate as the observer's eyes recover toward a normal color perception, such that light compensation ceases just as the observer's eyes completely recover from the previous light exposure.

In another example scenario, if the observer's eyes are less responsive to orange light as a result of exposure to orange colored light, an abrupt switch to neutral white light of 3500K will appear more blue and give the impression of light having a higher than desired color temperature. In one such example, temporarily commanding an intermediate or otherwise transitional light setting with a warm white transitional color will compensate for this apparent distortion and appear to the observer's eyes as a more neutral white light. In this example, after the observer's eyes have recovered from the initial exposure to orange light (after a period of time, such as 60 to 180 seconds, or an otherwise appropriate amount to allow a less visually disruptive or noticeable transition), the lighting system may transition to the target neutral white color at 3500K. Such intermediate or transitional light settings may make the transition to the target light setting less perceptible or otherwise allow an observer's eyes to recover from an initial exposure to colored light and correctly perceive the intended light color, as will be appreciated in light of this disclosure.

Similarly, in embodiments where the target light color is neutral white and the observer is initially exposed to green or pink light, the lighting system may command a transitional setting of white light having a green or pink hue, respectively, in order to compensate for the eyes' reduced sensitivity to those colors. After the observer's eyes have recovered from the reduced sensitivity to a particular color (for a suitable delay period, such as 60 seconds), the steady state target setting of neutral white light may be commanded. A chromaticity diagram or other color diagram or table may be used, for example, to determine the color components associated with the initial light setting, transition setting, and/or target light setting. In some embodiments, multiple transitional/intermediate settings each with a distinct transitional color may be used to provide a more gradual and less perceptible transition from the initial light setting to the target light setting. In other embodiments, switching between any two light settings may involve a gradual fading of the light from one setting to the other rather than an abrupt switch. This gradual fading may occur over various time periods (e.g., 5-30 seconds, or longer, depending on the perceptible differences between the initial and target light colors). In some embodiments, for example, the transition timing is determined based on the duration of the observer's exposure to the initial colored light, the perceptible differences between the initial and target light colors, or any other colors also illuminating the observer's area (proximity of other colored light sources to the changing light source), or any combination of such factors.

As indicated above, in addition to prior exposure to colored light, an observer's perception of a particular light source may also be affected by the illumination of distinctly colored light sources nearby. In particular, when two light sources having only slightly different color temperatures and/or color saturations are placed next to each other, the human-perceptible differences between those light sources may become amplified. For example, two proximal light sources which, when illuminated individually, appear to have weak non-saturated blue and orange colors, respectively, will appear to have higher color saturations when illuminated together. This perceived distortion may be compensated for, in some embodiments, by calculating a compensation value to adjust the color, color temperature, and/or color saturation of one or more light sources when a distinctly colored light source is illuminated nearby. This compensation value allows various light sources to be illuminated together while maintaining the same appearance they would have if they were illuminated separately. In the scenario provided above, a compensation value may decrease the color saturation of the blue and/or orange light sources when both are illuminated together in order to compensate for the perceived amplification in color saturation.

In another example scenario, assume a room is equipped with a multi-chip LED panel system configured to provide an initial light setting of neutral white light with a color temperature of 3500K, and a blue illumination is subsequently introduced into the room. The contrast between the white and blue light, in this example, causes the neutral white light to appear slightly warmer or at a lower-than-desired color temperature. In such an example, a compensation value of, for example, +1000K could be applied to the white light in order to return the observer's impression to a more neutral white light. Note that, in this case, the adjustment to the white light could be provided, for example, all at once and at the same time as when the blue light is turned on, so as to effectively neutralize the change that may have been perceptible without the adjustment. The distinctly colored light sources may include, for example, light fixtures, windows, and/or electronic screens or displays. In one such embodiment, an electronic screen or display may be considered both a colored stimuli which suppresses color sensitivity of the eyes and also part of the spatial configuration of light sources. In some embodiments, the compensation value may be calculated based on the proximity and/or distinctiveness of the light sources. For example, a larger compensation value may be warranted when two highly distinct light sources are illuminated together, or when distinct light sources are illuminated very close to one other.

As previously explained, the lighting control system disclosed herein may be used, for example, in conjunction with light-based communications and/or a power conservation scheme. In one such embodiment, specific light settings can be linked to activities occurring in an area, and those settings requiring higher power consumption can be restricted to when and where they are most critical. For example, while occupied areas of an office may be illuminated with a warm white light (e.g., 2900K) and provide an illuminance of 200-400 lux at work surfaces, unoccupied areas could be tuned to an energy saving yet aesthetically pleasing color like green. The intensity of light for unoccupied areas could be sufficiently high enough for safety, design, and/or communication purposes. The power required for blue or purple illumination was found to be four to five times less than for white illumination, while the power required for green illumination was about one tenth of that needed for white illumination. Some embodiments of the present disclosure provide a lighting control system that is configured to receive data from one or more sensors within the illuminated area. Detection signals from the sensors can in turn be used to make lighting determinations based on the occupancy and/or location of individuals. In one example embodiment, a sensor network connected to the lighting control system may include, for instance, passive infrared heat and/or motion sensors, radio frequency identification tag sensors, daylight sensors, ultrasound positioning sensors, motion sensors attached to objects, and/or video-based sensors, just to name a few examples. In any such cases where lights are changing from one color to another (e.g., for communication purposes, power saving purpose, or some other reason), the transition of light can be governed as provided herein to include one or more transitional phases.

In still other embodiments, changes in colored light may be used to create an exciting or otherwise pleasing atmosphere, or to emphasize the identity of a company's presence within a building, or to communicate the status of an area (e.g., that particular person is unavailable or not to be disturbed). Possible benefits of these applications may include, for example, enhanced productivity in the workplace, attraction and flow of clients in a commercial building, and/or a more welcoming atmosphere in a hospitality setting. As will be appreciated in light of this disclosure, in any such cases where lights are changing from one color to another for whatever reason, the transition of light can be governed as provided herein to include one or more transitional phases.

Example Lighting System

FIG. 1 is a block diagram illustrating a lighting control system configured in accordance with an embodiment of the present invention. As can be seen, the system includes a lighting computer 100, a lighting controller 115, and a plurality of LED panels numbered 1-N. The lighting controller 115 can be implemented, for example, with conventional or custom technology, as will be appreciated. An example lighting controller includes, for instance, the DMX512, although any controller capable of receiving commands and issuing the appropriate lighting control signals can be used. Example lighting control signals may be, for instance, for turning a light on/off, adjusting the intensity, color, and/or color temperature of light.

With further reference to FIG. 1, the lighting computer 100 of this example embodiment includes a processor 113 and a memory 112. The memory has a number of modules stored thereon that can be accessed and executed by the processor 113, including a lighting environment determination module 105, a lighting control module 109, a light transition setting module 107, and an ambient light compensation module 111. The modules can be implemented, for example, in any suitable programming language (e.g., C, C++, objective C, JavaScript, custom or proprietary instruction sets, etc.), and encoded on a machine readable medium, that when executed by the processor 113 (and/or co-processors), carries out the lighting control functionality as variously described herein. The computer readable medium may be, for example, a hard drive, compact disk, memory stick, server, or any suitable non-transitory computer/computing device memory that includes executable instructions, or a plurality or combination of such memories. In other embodiments, the functionality of modules 105, 107, 109, and 111 can be implemented, for instance, with gate-level logic or an application-specific integrated circuit (ASIC) or chip set or other such purpose-built logic, or a microcontroller having input/output capability (e.g., inputs for receiving user inputs and outputs for directing other components) and a number of embedded routines for carrying out the device functionality. In short, the functional modules 105, 107, 109, and 111 can be implemented in hardware, software, firmware, or a combination thereof.

The lighting control module 109 can be configured to issue light settings to processor 113 and communicate with the other modules included in memory 112. The processor 113 can be implemented with any number of suitable central processing units or microcontrollers capable of receiving input, executing various routines, outputting light control signals, and generally directing the overall lighting process in accordance with an embodiment of the present invention. As will be appreciated, the modules are implemented with software in this example embodiment, but as previously explained, they may also be implemented in any one or combination of software, firmware and/or hardware in other embodiments. Additional componentry of the lighting computer not shown will be apparent in light of this disclosure, including any necessary hardware and software that enable typical functionality of a computing system (e.g., communication busses, video drivers, ROM, RAM, co-processors, display, user interface, input/output circuitry and devices, operating system, etc.).

In this example embodiment, the lighting computer 100 is configured to receive data from a schedule input 103 and/or various physical presence or activity sensors 101 and to interpret that data. This data is provided to the lighting environment determination module 105, which can be programmed or otherwise configured to detect a scheduled event reflected in the schedule input 103 and/or identify activity (e.g., physical, aural, smoke, carbon monoxide, etc.) reflected in the sensor data 101, and to determine whether a new light setting is desired. As discussed above, new light settings may be used, among other things, as a reminder for a scheduled event, a communication medium, and/or an energy saving means.

Once a new target light setting has been determined, the light transition setting module 107 can be programmed or otherwise configured to compare the target light setting with the current light setting and determine whether one or more light transition settings should be displayed prior to displaying the target light setting. As discussed above, a light transition setting may be displayed, in some embodiments, in order to allow an observer's eyes to more comfortably transition between two light settings. In some embodiments, the light transition setting module 107 will calculate the difference in color and color temperature between the initial light setting and the target light setting, as well as the amount of time an observer has been immersed in the current light setting, and determine the appropriate number of transition settings, the transitional color for each transition setting, the transitional display times, and/or the fade times for the desired light change. In one example embodiment, lighting controller 115 can communicate with processor 113 and the various modules within memory 112 in order to provide the duration, color temperature, and/or intensity of the initial light setting for each of the LED panels 1-N. As previously mentioned, changing the light settings of one or more LED panels may cause an unintended distortion in appearance of the other LED panels within an area. In such cases, the ambient light compensation module 111 can be programmed or otherwise configured to calculate a compensation value for adjusting the color, intensity, and/or color temperature settings of one or more LED panels to compensate for unintended distortions caused by changing light settings.

As will be appreciated, the lighting control system may include fewer or more components, in some embodiments, depending on the desired functionality. In addition, other embodiments may be implemented with a higher or lower degree of integration, such that some components are included within or otherwise integrated with other components. For instance, in various embodiments, the lighting controller 115 may be included within lighting computer 100, light transition setting module 107 may be included within ambient light compensation module 111, or memory 112 may include a single module programmed or otherwise configured to perform the functions of each of modules 105, 107, 109, and 111. Numerous other configurations will be apparent in light of this disclosure, and the claimed invention is not intended to be limited to any particular one.

Figure 2A:
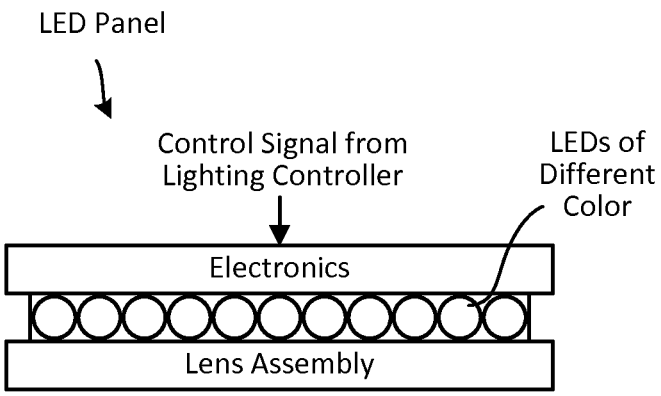
FIG. 2*a* shows a cross sectional view of an example LED panel that can be used in the LED lighting system of FIG. 1, according to an embodiment of the present invention.

FIG. 2a illustrates an example multi-chip LED panel that can be used in the lighting control system of FIG. 1, configured in accordance with an embodiment of the present invention. Multi-chip LED technology with independent color channel control are able to display both saturated colors and white light from a single LED panel by controlling the proportions of the various color components. For example, an RGB LED panel having an array of red, green, and blue colored LEDs can create various illumination patterns and colors by independently controlling each color channel. In such an example, equal proportions of red, green, and blue light will produce white light, while equal proportions of green and red light with no blue light will produce yellow light. As will be appreciated, other colors may be attained by creating various proportions of colored light. A system of such panels may provide independent control of the color, color temperature, and/or intensity of each panel within a lighting system, in some embodiments. LED technology is used in some embodiments, as it allows lighting panels to be built in arrays of colored LEDs that can be individually controlled. However, any number of suitable lighting technologies that can be controlled in accordance with an embodiment of the present invention can be used, and the claimed invention is not intended to be limited to any particular LED or other lighting technology. The example LED panel of FIG. 2a further includes electronics configured for receiving a control signal (e.g., from a lighting controller), and engaging the corresponding LEDs in a manner that is responsive to the control signal. In addition, this example embodiment further includes a lens assembly for directing the focus of light and/or blending light from the individual LEDs.

Figure 2B:
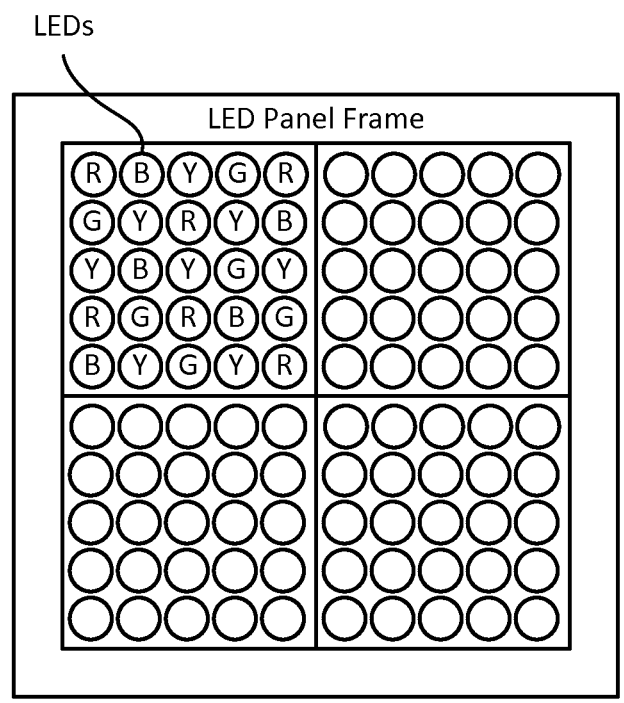
FIG. 2*b* shows an example LED panel that can be used in the LED lighting system of FIG. 1, according to an embodiment of the present invention.

FIG. 2b illustrates an example multi-chip LED panel that can be used in the lighting control system of FIG. 1, configured in accordance with another embodiment of the present invention. In this particular example, the LED panel includes an LED panel frame surrounding an array of individual colored LEDs. This particular example is a four-channel RGBY (red, green, blue, yellow) LED panel, and the upper left quadrant of the LED array shows an example arrangement for the colored LEDs. Each colored LED within the array may be individually controlled to provide the desired white or colored light based on input from the lighting controller.

Figure 3A:
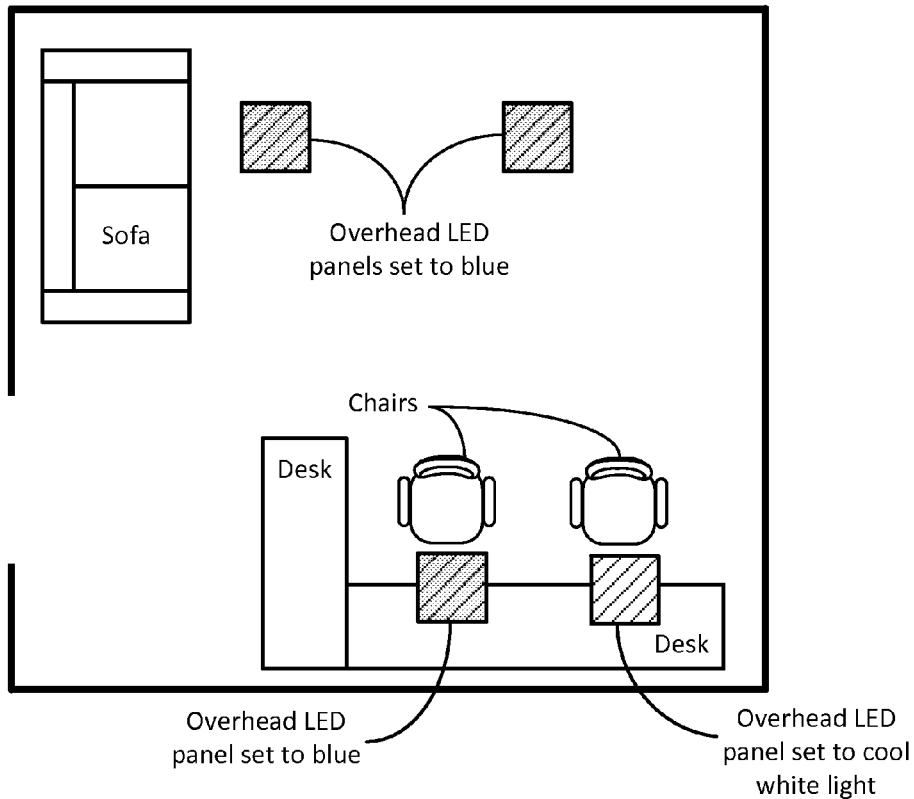
FIGS. 3*a-c* each illustrates an overhead view of an office room implementing the lighting control system of FIG. 1, according to an embodiment of the present invention.
Figure 3B:
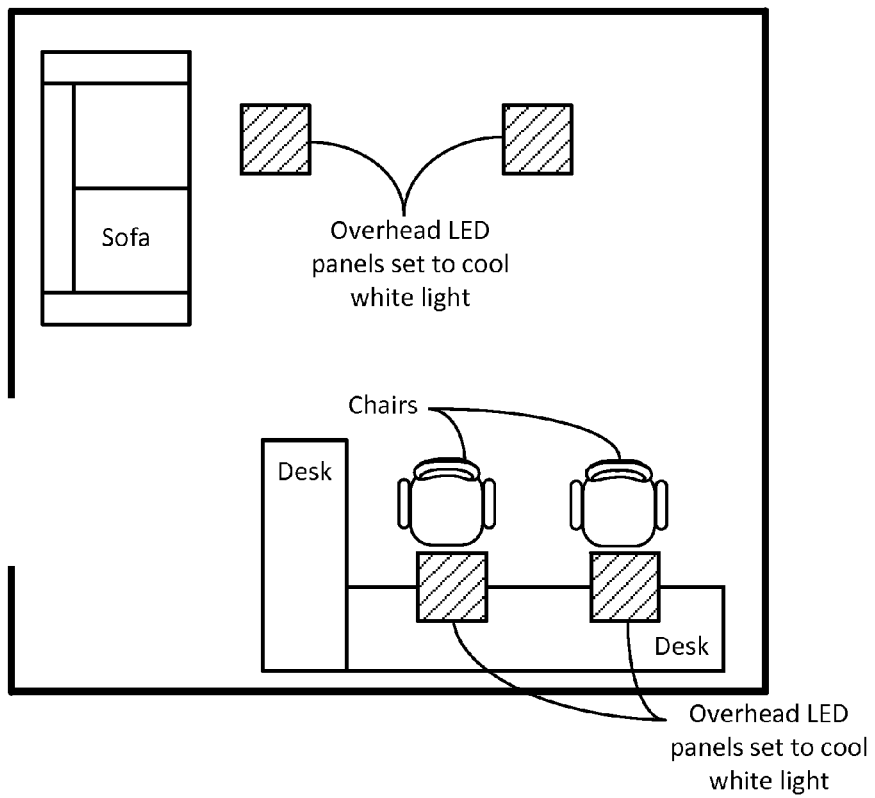
Figure 3C:
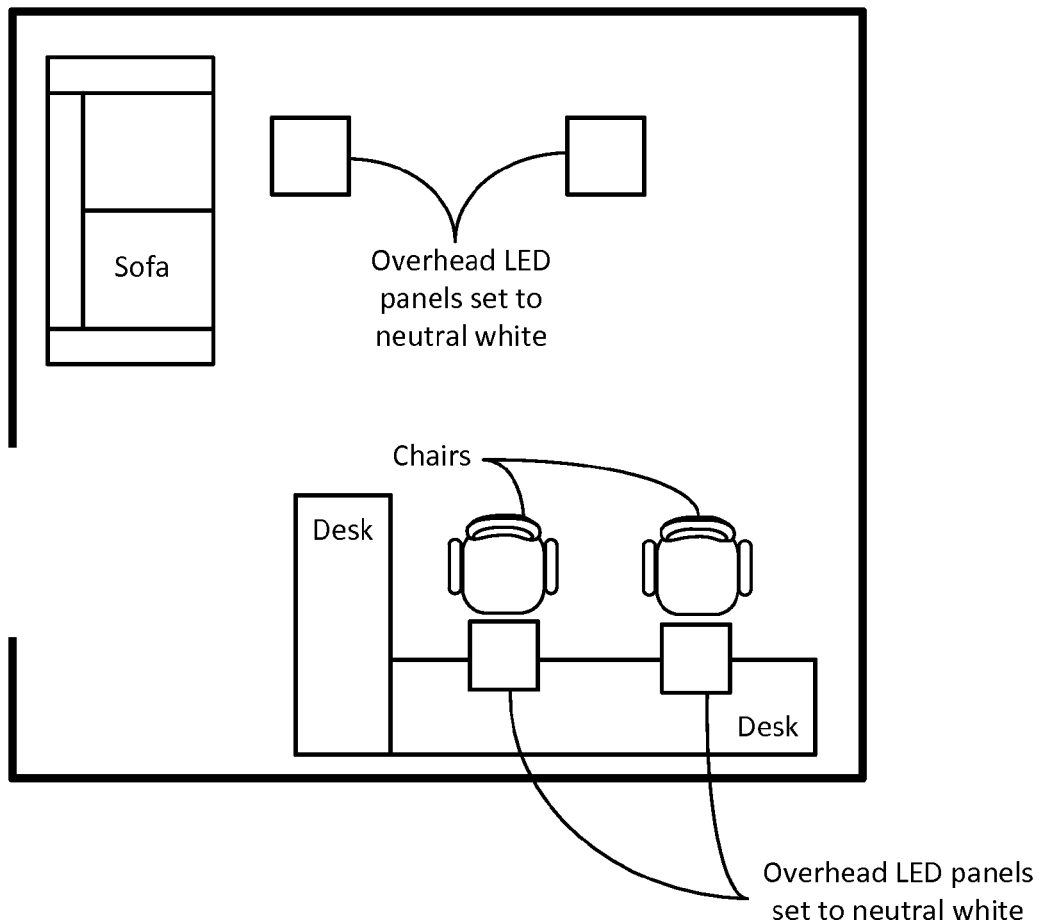

FIGS. 3a-c each illustrates an overhead view of an office room implementing the lighting control system of FIG. 1, according to an embodiment of the present invention. As can be seen, the office floor plan in this particular example includes two desks, two chairs, an overhead LED panel above each chair, a sofa, and two overhead LED panels over a common area of the office. In this particular example, the initial light settings can be seen in FIG. 3a, where the LED panel over one of the chairs is displaying white light and the rest of the LED panels are displaying blue light. As discussed above, colored light may be implemented in the common areas or above working spaces for a number of different reasons including energy savings or to communicate a message, in some embodiments, and switching between light settings may cause an apparent distortion to an observer's eyes. The target light setting, in this example, is a neutral white light with a color temperature of 3500K, and the example transition setting may be seen in FIG. 3b, where all the LED panels are displaying a cool white light with a color temperature of, for example, 4500K. In some embodiments the light change from the initial light setting shown in FIG. 3a and the light transition setting shown in FIG. 3b includes a gradual fading performed over, for example, 5-10 seconds (or an otherwise appropriate amount of time to allow a less visually disruptive or noticeable transition). Once the transition setting has been reached, the display time for this transition setting may be, for example, 10-30 seconds so that the observer's eyes can recover from the exposure to the initial light setting before switching to the target light setting. This display time may generally be referred to herein as a transitional display time. The example target light setting of neutral white light with a color temperature of 3500K being displayed from all of the overhead LED panels is shown in FIG. 3c. In some embodiments, the light change between the transition setting shown in FIG. 3b and the target light setting shown in FIG. 3c also includes a gradual fading over a period of time (e.g., 5-30 seconds), In some specific embodiments, the various light setting and timing values of the lighting control system disclosed herein and described in reference to FIGS. 1 and 3a-c may follow the example values shown in Table 1. Note that these examples and are not intended to limit the claimed invention but are provided to show a number of specific example configurations. As will be further appreciated, the initial light settings, target light settings, number of transition settings, transitional color for each transition setting, fade times, and/or transitional display times for a given setting can change from one embodiment to the next and will depend on various factors specific to each individual application. Numerous other configurations will be apparent in light of this disclosure.

TABLE 1

Example Light Setting and Timing Values

| Initial Light | Exposure Duration | Target Light | 1$^{st}$ Fade | 1$^{st}$ Transition | 2$^{nd}$ Fade | 2$^{nd}$ Transition | 3$^{rd}$ Fade |
|---|---|---|---|---|---|---|---|
| Orange | 1-15 min. | 3500 K white | 5-10 seconds | 10-30 sec. at 2800 K | 5-30 seconds | N/A | N/A |
| Blue | 0-5 min. | 3500 K white | 5-10 seconds | 10-30 sec. at 4000 K | 5-30 seconds | N/A | N/A |
|  | >5 min. | 2900 K white | 5-10 seconds | 10-30 sec. at 5000 K | 5-10 seconds | 10-30 sec. at 3500 K | 5-30 seconds |

As can be seen in Table 1, one specific embodiment involves an initial light setting displaying orange light to which an observer has been exposed for between 1-15 minutes. The target light setting, in this example, is a neutral white having a color temperature of 3500K. In this particular embodiment, because orange light is considered a warm color, the light is first faded to a light transition setting of a warm white light at a color temperature of 2800K. In this example, the orange light fades to the warm white transition setting over a first fade time of between 5-10 seconds, and the transitional display time for this transition setting is 10-30 seconds. The warm white light then gradually fades to the target white light with a color temperature of 3500K over a second fade time of between 5-30 seconds, in this example.

Another embodiment involves an observer who has been exposed to blue light for between 0-5 minutes and the target light setting is a neutral white having a color temperature of 3500K. In this particular embodiment, because blue light is considered a cool color, the light is first faded to a light transition setting of cool white light at a color temperature of 4000K. In this example, the blue light fades to the cool white transition setting over a first fade time of 5-10 seconds, and the transitional display time for this transition setting is between 10-30 seconds. The cool white transition setting is then gradually faded to the target white light with a color temperature of 3500K over a second fade time of 5-30 seconds, in this example. In another embodiment, if the observer's eyes have been exposed to the colored light for only a few seconds, the eyes can recover more quickly and the lighting change may occur in a single step by fading to the target neutral white light over a single fade time of 5-10 seconds, for example.

In still another embodiment, an observer has been exposed to blue light for over five minutes, and the target light setting is a warm white light with a color temperature of 2900K. In this particular embodiment, the light change includes a first transition setting with a cool white transitional color at 5000K and a second transition setting with a neutral white transitional color at 3500K. In this example, the blue light fades to the first transition setting over a first fade time of 5-10 seconds, and this setting is held for a transitional display time of 10-30 seconds while the observer's eyes recover from the initial exposure to blue light. In this example, the first transition setting gradually fades to the second transition setting over a second fade time of 5-10 seconds, and this second setting is held for a transitional display time of 10-30 seconds while the observer's eyes recover from the exposure to the first transition setting. The neutral white second transition setting is then gradually faded to the target warm white light with a color temperature of 2900K over a second fade time of 5-30 seconds, in this example.

As previously mentioned, the example color temperature and timing values described in reference to Table 1 are for illustrative purposes only, and many other embodiments will be apparent in light of this disclosure. For example, shorter fade times and/or transition times than the ones described in Table 1 may be desirable for occupants who want to arrive at the target white light more quickly. The number of light transition settings, the transitional display times, and/or the fade times used to arrive at a target steady state light setting may depend on various factors including, for example, the duration of exposure, intensity, color saturation, and/or viewing angle of an initial colored light setting. In one embodiment, the number of light transition settings, the duration of the transitional display times, and/or the duration of the one or more fade times are proportional to the duration of exposure to, intensity of, and/or color saturation of an initial light setting. For example, longer exposure times or exposure to high intensity and/or highly saturated colored light may result in a longer lasting and increased initial distortion of subsequently displayed white light. This increased distortion may therefore require a proportional or otherwise corresponding increase in the number of light transition settings, the duration of transitional display times, and/or the duration of fade times between light settings in order for an observer's eyes to correctly perceive the new light settings. Note that the use of proportional herein is not intended to implicate a precise relationship between the variables; rather, if two variables are proportional then an increase in one variable tends to correspond with an increase in the other variable.

For instance, consider the following example scenario, where exposure to blue light for 5 seconds resulted in no noticeable distortion in a subsequently displayed white light, while exposure to blue light for 15 seconds caused a subsequently displayed neutral white light to appear slightly warm for about 5 seconds. In this scenario, no transition settings or fade times may be required after an initial exposure time of only 5 seconds because no distortion was perceived. However, an increased initial exposure time of 15 seconds created a distortion of about 5 seconds and may warrant a transition setting and/or one or more fade times between the light settings. In this example, because the distortion was perceived for about 5 seconds, the fade times and/or transitional display times may be relatively short resulting in a total time of, for example, 5-10 seconds between light settings. In another example, exposure to blue light for 1-5 minutes resulted in a noticeable warm distortion of subsequently displayed neutral white light which returned to a tolerable level after about 30 seconds and was mostly unnoticeable after 60 seconds. This increase in the initial exposure time from 15 seconds to 1-5 minutes caused an increase in the duration of perceived distortion, warranting a corresponding increase in the duration of transitional display times, and/or the duration of fade times between light settings. In one embodiment, the fade times and/or transitional display times may combine for a total time of, for example, 60-90 seconds between light settings in order to account for the increased duration of perceived distortion. In this particular example, although the duration of perceived distortion was similar (about 30-60 seconds) for exposure times between 1-5 minutes, the magnitude of initial distortion appeared greater after an initial exposure time of 5 minutes compared to 1 minute. In such an example, in addition to increasing the duration of transitional display times and/or fade times, increasing the number of transition settings may help compensate for the increased magnitude of distortion.

Figure 4A:
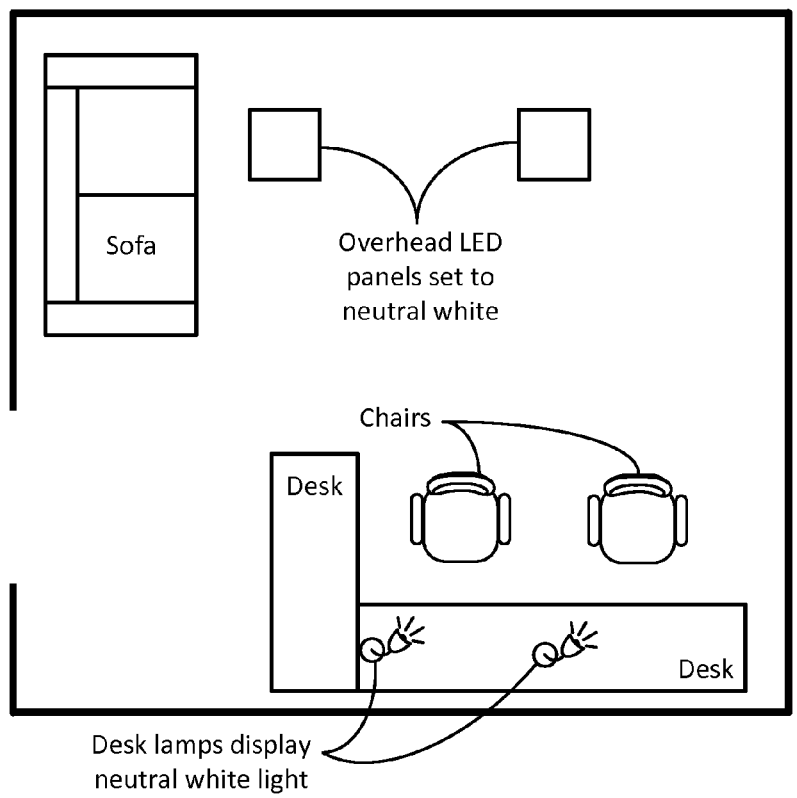
FIGS. 4*a-b* each illustrates an overhead view of an office room implementing the lighting control system of FIG. 1, according to another embodiment of the present invention.
Figure 4B:
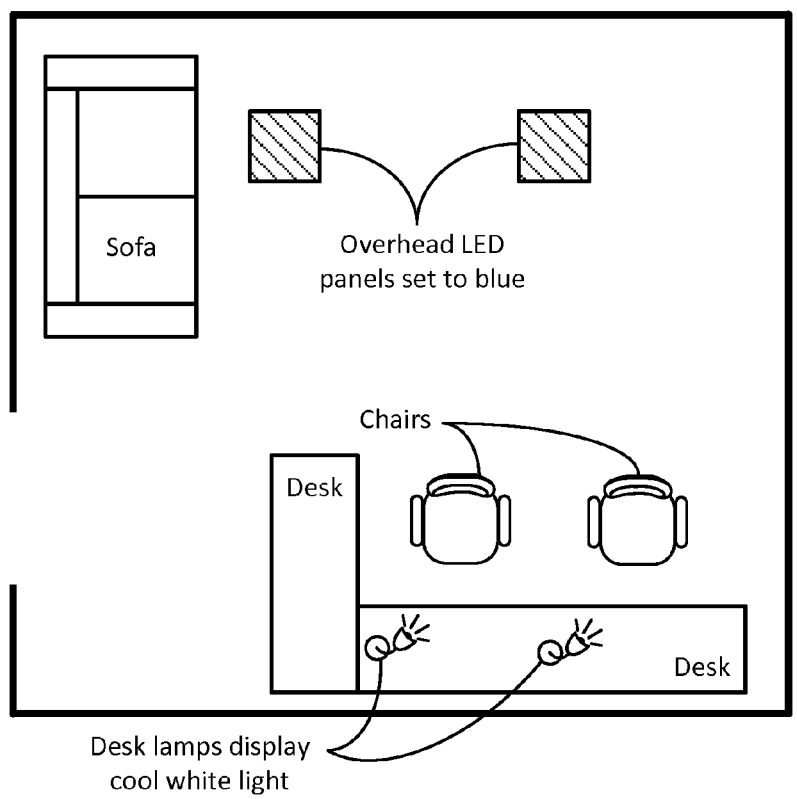

FIGS. 4a-b each illustrates an overhead view of an office room implementing the lighting control system of FIG. 1, according to another embodiment of the present invention. As can be seen, the office floor plan in this particular example includes two desks, two chairs, a desk lamp next to each chair, a sofa, and two overhead LED panels over a common area of the office. In this particular example, the initial light settings can be seen in FIG. 4a, where the desk lamps and the LED panels over the common area are displaying neutral white light. As discussed above, perceived colors may be distorted when light sources of different colors are presented close to one another, and it may be necessary to adjust light settings in order to avoid this distortion. For example, when the light settings are changed such that the overhead LED panels begin displaying blue light, as shown in FIG. 4b, the neutral white desk lamps may appear slightly yellow-orange, or of a lower color temperature, if they are not slightly adjusted. However, as seen in FIG. 4b, a compensation value has been applied to the desk lamps so they will display a cool white light in order to compensate for the apparent distortion caused by the overhead blue light.

Additional Examples

In one example embodiment, the lighting control system includes a number of LED panels and is linked to a calendar or schedule, as well as a network of activity recognition sensors. Based on the calendar and sensor inputs, the system can display various combinations of lighting scenarios most suitable for a certain area, at a certain time, depending on the demands of the activity detected within the area. In such a system, the changes in light settings may be triggered, for example, by a pre-determined schedule or calendar event, by activity detected within a room, or by direct input from a user. In one specific example, when an office space is occupied, the LED panels are tuned to the desired warm white light with high illuminance. In such an example, when the sensor network determines that the office space is unoccupied, or a calendar determines that optimal lighting is no longer required, the LED panels can transition to colored light that will provide energy savings but will be carefully and precisely crafted for the company or user. In some embodiments, the LED panels will display an aesthetically pleasing color that has an identity connecting that particular color to the occupancy status of the room, or some other message. In such an example, the colored light can serve four distinct functions: provide safe illumination of the area (to prevent tripping), provide a comfortable and pleasing accent, visually convey the status of a room, and save energy.

In another example embodiment, in addition to monitoring the movements of people within an office environment the sensor network may also include sensors monitoring the use of a computer, office chair, telephone, desk surface, desk drawer, white board, etc. Such sensors can detect the user's activity and provide optimized light settings for that particular activity. In one such example, if the user is at a computer desk, the overhead ceiling light may be dimmed to increase screen contrast and other unoccupied areas of the office may display colored light to save energy. Similarly, other activities such as using a phone, using a white board, using a meeting table, looking through a desk drawer, etc. may be assigned their own customized light settings. In another example embodiment, motion sensors outside of an office can trigger a lighting change within the office and alert an occupant of an approaching visitor.

In another example embodiment, when the sensors have determined that an office space is vacant for a minimum number of minutes (e.g., three minutes), the light may fade from the previous setting to a colored setting, for example from white light to purple light, representing that the office has been vacant for a brief period of time. In some embodiments, after 20 minutes and 40 minutes, the lights may fade to a second and third color in order to represent that the office has been vacant for over 20 minutes and over 40 minutes, respectively. Various other light settings, color combinations, sequences, and fade times may be implemented and will be apparent in light of this disclosure. As will be appreciated in light of this disclosure, in any such cases where lights are changing from one color to another for whatever reason, the transition of light can be governed as provided herein to include one or more transitional phases and/or compensate for apparent distortions caused by other light sources.

Methodologies

Figure 5:
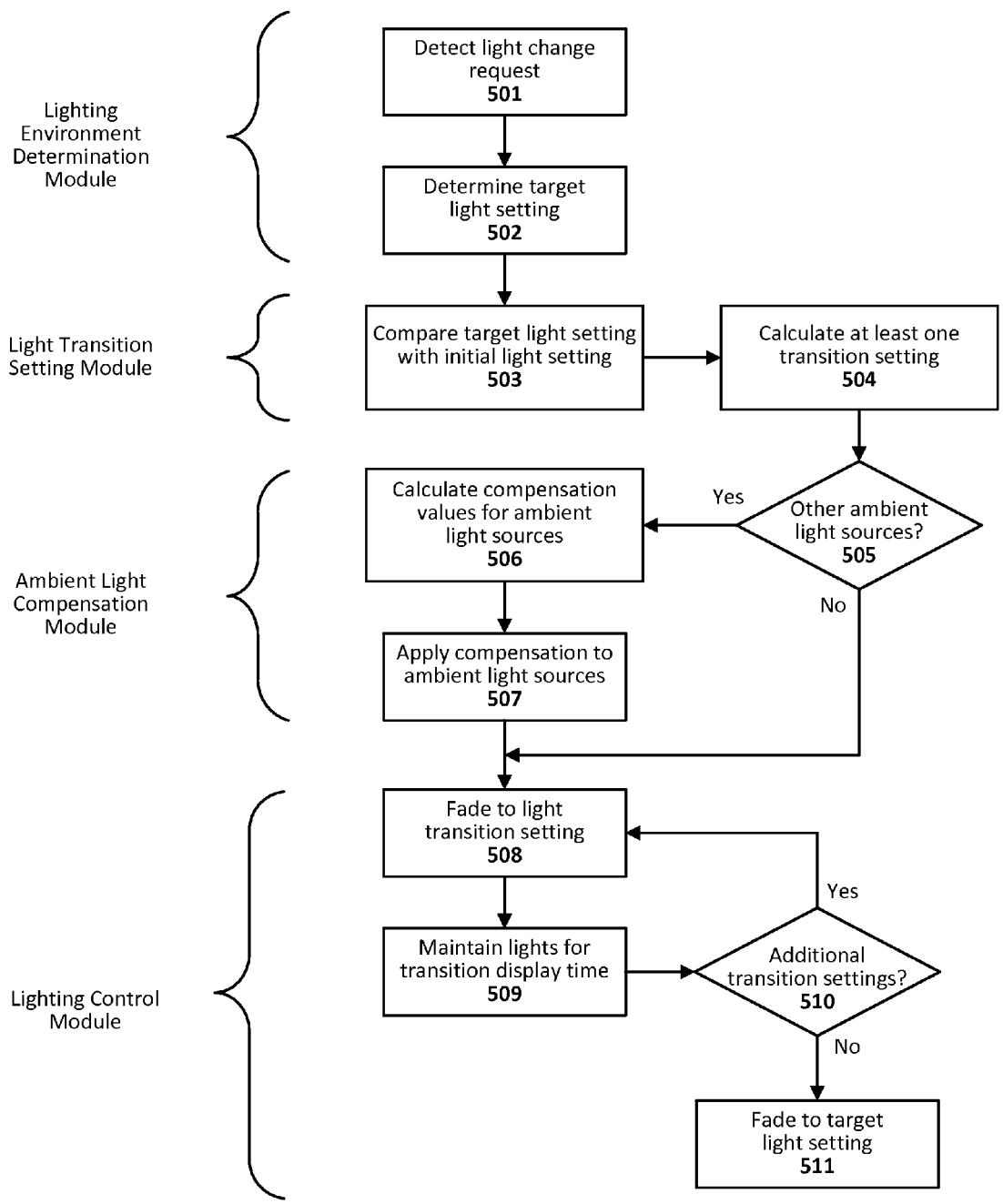
FIG. 5 is a flow chart demonstrating a method of controlling the lighting system of FIG. 1, according to an embodiment of the present invention.

FIG. 5 is a flow chart illustrating a process flow carried out by lighting environment determination, light transition setting, ambient light compensation, and lighting control modules that can be used in the lighting system of FIG. 1, configured in accordance with an embodiment of the present invention. As will be appreciated, the modules are shown as being distinct from one another in the example embodiment of FIG. 1, but in other embodiments they may be formed as an integrated module. The lighting control techniques described herein may be implemented using various other degrees of component and functional integration or distinctness.

In this example case, the method includes detecting 501 a light change request. In some cases, the light change request may include a request to change the color of one or more LED panels within a room in order to conserve energy, communicate a message, and/or remind an occupant of a scheduled event, just to name a few examples. Once a light change request has been detected, the method may continue with determining 502 the target light setting. The method may continue with comparing 503 the target light setting with the initial light setting and calculating 504 at least one light transition setting. As discussed above, an abrupt change in light settings may cause an observer to perceive temporary distortions in the target light setting, and one or more transition settings allow an observer's eyes to recover from exposure to the initial light setting. Calculating the light transition setting may include, for example, calculating a color temperature value, color saturation value, one or more fade times, and/or a transitional display time for a given setting. The method may continue with determining 505 whether other ambient light sources are present within the illuminated area. As previously mentioned, introducing new light settings in an illuminated area can distort the perception of other ambient light sources within the area. Such distortion can be compensated for by adjusting the light settings of the ambient light sources. If other ambient light sources are present, the method may continue with calculating 506 the compensation values for the ambient light sources, and applying 507 the compensation value to the ambient light sources. The degree of compensation applied to the ambient light sources may be determined based on, for example, the intensity, color saturation, color temperature, and/or proximity of the new light source. The method may continue with fading 508 to the light transition setting calculated at 504. If no other ambient light sources are determined to be present within the illuminated area at 505, the method may also continue with fading 508 to the light transition setting. The method may continue with maintaining 509 the light transition setting for a specific display time, allowing the observer's eyes recover from exposure to the previous light setting. The method may then continue with determining 510 whether additional transition settings have been calculated. If so, the method may repeat 508-510 until no additional transition settings exist. If no additional transition settings have been calculated, the method may continue with fading 511 the lights to the target light setting. As discussed above, the number of transition settings, the transitional color of each transition setting, as well as the fade times between each setting may vary from one embodiment to the next, and in some cases are determined based on the duration of exposure to, color temperature, color saturation, and/or intensity of an initial light setting.

Numerous embodiments will be apparent, and features described herein can be combined in any number of configurations. One example embodiment provides a lighting control system. The system includes a lighting controller configured to control at least one lighting element. The system also includes a processor. The system also includes a lighting environment determination module executable by the processor and configured to determine a target light setting. The system also includes a light transition setting module executable by the processor and configured to compare the target light setting with an initial light setting and determine at least one light transition setting, the at least one light transition setting having a transitional color and transitional display time based on at least one of duration of exposure to, intensity of, and color saturation of the initial light setting. The system also includes a lighting control module executable by the processor and for issuing light setting commands to the lighting controller, the lighting control module configured to command the at least one light transition setting prior to commanding the target light setting. In some cases, the transitional color of the at least one light transition setting is one of multiple light transition settings commanded between the initial light setting color and the target light setting color. In some cases, the lighting control module is further configured to command the lighting controller to fade the at least one lighting element from the initial light setting to the at least one light transition setting over a first fade time. In some such cases, the first fade time is proportional to at least one of the duration of exposure to, intensity of, and/or color saturation of the initial light setting. In some cases, the number of light transition settings is proportional to at least one of the duration of exposure to, intensity of, and/or color saturation of the initial light setting. In some cases, the transitional display time of the at least one light transition setting is proportional to at least one of the duration of exposure to, intensity of, and/or color saturation of the initial light setting. In some cases, the lighting environment determination module is further configured to receive data from one or more sensors within an area, and the target light setting is determined based on the sensor data. In some such cases, a color of the target light setting communicates a message regarding activity detected by the one or more activity sensors. In some cases, a detectable change in light color between the initial light setting and the target light setting conveys a message to the user regarding a scheduled event, which is notified to the system by schedule input received by the lighting environment determination module. In some cases, the at least one lighting element includes a plurality of multi-chip LED panels each panel having independent color channel control. In some cases, the system also includes an ambient light compensation module executable by the processor and configured to calculate a light compensation value for adjusting the intensity and/or color of the target light setting in response to illumination of a distinctly colored light source proximate to the at least one lighting element. In some such cases, the light compensation value is calculated based on the proximity and/or distinctiveness of the distinctly colored light source.

Another example embodiment provides a method of controlling a lighting system. The method includes determining a target light setting for at least one LED panel. The method also includes calculating a decrease in at least one color component between an initial light setting and the target light setting. The method also includes calculating at least one transitional color having a larger proportion of the at least one decreased color component compared to the target light setting. The method also includes calculating a transitional display time for each of the at least one transitional color, wherein the transitional display time is based on at least one of the duration of exposure to, intensity of, and color saturation of the initial light setting. The method also includes displaying, via the at least one LED panel, light at the at least one transitional color for the corresponding transitional display time. The method also includes displaying, via the at least one LED panel, light at the target light setting. In some cases, displaying light at the at least one transitional color includes fading the at least one LED panel from the initial light setting to the at least one transitional color over a first fade time, and displaying light at the target light setting includes fading the at least one LED panel from the at least one transitional color to the target light setting over a second fade time. In some such cases, the first and second fade times are proportional to at least one of the duration of exposure to, intensity of, and/or color saturation of the initial light setting. In some cases, the number of the at least one transitional colors is proportional to at least one of the duration of exposure to, intensity of, and/or color saturation of the initial light setting. In some cases, the method also includes calculating a decrease in observer sensitivity to at least one color based on at least one of the duration of exposure to, intensity of, and/or color saturation of the initial light setting; and the transitional color has a higher component of the at least one color to which the observer has decreased sensitivity. In some cases, the transitional display time is proportional to at least one of the duration of exposure to, intensity of, and/or color saturation of the initial light setting.

Another example embodiment provides a computer program product including a plurality of instructions non-transiently encoded thereon and executable by one or more processors to carry out a process. The computer program product may include one or more computer readable media such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In one such example embodiment, the process is configured to: determine a target light setting for at least one LED panel; calculate a decrease in at least one color component between an initial light setting and the target light setting; calculate at least one transitional color having a larger proportion of the at least one decreased color component compared to the target light setting; calculate a transitional display time for each of the at least one transitional color, wherein the transitional display time is based on at least one of the duration of exposure to, intensity of, and/or color saturation of the initial light setting; display, via the at least one LED panel, light at the at least one transitional color for the corresponding transitional display time; and display, via the at least one LED panel, light at the target light setting. In some cases, the process is also configured to fade the at least one LED panel from the initial light setting to the at least one transitional color over a first fade time; and fade the at least one LED panel from the at least one transitional color to the target light setting over a second fade time.

The foregoing description of the embodiments of the invention has been presented for the purposes of illustration and description. The various techniques and systems herein have been described relative to specific embodiments thereof, but are not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A lighting control system comprising:
    a lighting controller configured to control at least one lighting element;
    a processor;
    a lighting environment determination module executable by the processor and configured to determine a target light setting;
    a light transition setting module executable by the processor and configured to compare the target light setting with an initial light setting and determine at least one light transition setting, the at least one light transition setting having a transitional color and transitional display time based on at least one of duration of exposure to, intensity of, and color saturation of the initial light setting; and
    a lighting control module executable by the processor and for issuing light setting commands to the lighting controller, the lighting control module configured to command the at least one light transition setting prior to commanding the target light setting.

2. The system of claim 1 wherein the transitional color of the at least one light transition setting is one of multiple light transition settings commanded between the initial light setting color and the target light setting color.

3. The system of claim 1 wherein the lighting control module is further configured to command the lighting controller to fade the at least one lighting element from the initial light setting to the at least one light transition setting over a first fade time.

4. The system of claim 3 wherein the first fade time is proportional to at least one of the duration of exposure to, intensity of, and color saturation of the initial light setting.

5. The system of claim 1 wherein the number of light transition settings is proportional to at least one of the duration of exposure to, intensity of, and color saturation of the initial light setting.

6. The system of claim 1 wherein the transitional display time of the at least one light transition setting is proportional to at least one of the duration of exposure to, intensity of, and color saturation of the initial light setting.

7. The system of claim 1 wherein the lighting environment determination module is further configured to receive data from one or more sensors within an area, and the target light setting is determined based on the sensor data.

8. The system of claim 7 wherein a color of the target light setting communicates a message regarding activity detected by the one or more activity sensors.

9. The system of claim 1 wherein a detectable change in light color between the initial light setting and the target light setting conveys a message to the user regarding a scheduled event, which is notified to the system by schedule input received by the lighting environment determination module.

10. The system of claim 1 wherein the at least one lighting element comprises a plurality of multi-chip LED panels each panel having independent color channel control.

11. The system of claim 1 further comprising an ambient light compensation module executable by the processor and configured to calculate a light compensation value for adjusting at least one of intensity and color of the target light setting in response to illumination of a distinctly colored light source proximate to the at least one lighting element.

12. The system of claim 11 wherein the light compensation value is calculated based on at least one of proximity and distinctiveness of the distinctly colored light source.

13. A method of controlling a lighting system comprising:
    determining a target light setting for at least one LED panel;
    calculating a decrease in at least one color component between an initial light setting and the target light setting;
    calculating at least one transitional color having a larger proportion of the at least one decreased color component compared to the target light setting;
    calculating a transitional display time for each of the at least one transitional color, wherein the transitional display time is based on at least one of the duration of exposure to, intensity of, and color saturation of the initial light setting;
    displaying, via the at least one LED panel, light at the at least one transitional color for the corresponding transitional display time; and
    displaying, via the at least one LED panel, light at the target light setting.

14. The method of claim 13 wherein displaying light at the at least one transitional color comprises fading the at least one LED panel from the initial light setting to the at least one transitional color over a first fade time, and wherein displaying light at the target light setting comprises fading the at least one LED panel from the at least one transitional color to the target light setting over a second fade time.

15. The method of claim 14 wherein the first and second fade times are proportional to at least one of the duration of exposure to, intensity of, and color saturation of the initial light setting.

16. The method of claim 13 wherein the number of the at least one transitional colors is proportional to at least one of the duration of exposure to, intensity of, and color saturation of the initial light setting.

17. The method of claim 13 further comprising calculating a decrease in observer sensitivity to at least one color based on at least one of the duration of exposure to, intensity of, and color saturation of the initial light setting, and wherein the transitional color has a higher component of the at least one color to which the observer has decreased sensitivity.

18. The method of claim 13 wherein the transitional display time is proportional to at least one of the duration of exposure to, intensity of, and color saturation of the initial light setting.

19. A computer program product comprising a plurality of instructions non-transiently encoded thereon and executable by one or more processors to carry out the following process, the process comprising:

determine a target light setting for at least one LED panel;

calculate a decrease in at least one color component between an initial light setting and the target light setting;

calculate at least one transitional color having a larger proportion of the at least one decreased color component compared to the target light setting;

calculate a transitional display time for each of the at least one transitional color, wherein the transitional display time is based on at least one of the duration of exposure to, intensity of, and color saturation of the initial light setting;

display, via the at least one LED panel, light at the at least one transitional color for the corresponding transitional display time; and display, via the at least one LED panel, light at the target light setting.

20. The computer program product of claim 19, the process further comprising:

fade the at least one LED panel from the initial light setting to the at least one transitional color over a first fade time; and fade the at least one LED panel from the at least one transitional color to the target light setting over a second fade time.

* * * * *